(12) United States Patent
Mattmann et al.

(10) Patent No.: US 7,484,421 B2
(45) Date of Patent: Feb. 3, 2009

(54) FORCE SENSOR

(75) Inventors: Erich Mattmann, Heidesheim (DE); Klaus Weber, Kronberg (DE)

(73) Assignee: Siemens Aktiengesellschaft, München (DE)

( * ) Notice: Subject to any disclaimer, the term of this patent is extended or adjusted under 35 U.S.C. 154(b) by 64 days.

(21) Appl. No.: 11/343,032

(22) Filed: Jan. 30, 2006

(65) Prior Publication Data

US 2006/0169052 A1  Aug. 3, 2006

(30) Foreign Application Priority Data

Feb. 1, 2005  (DE) .................. 10 2005 004 603

(51) Int. Cl.
*G01B 7/16* (2006.01)
(52) U.S. Cl. ....................................... 73/777
(58) Field of Classification Search ............... 73/777
See application file for complete search history.

(56) References Cited

U.S. PATENT DOCUMENTS

| | | | |
|---|---|---|---|
| 4,507,973 A * | 4/1985 | Barr et al. ............... 73/724 |
| 4,586,018 A * | 4/1986 | Bettman ................... 338/42 |
| 5,154,247 A | 10/1992 | Nishimura et al. |
| 5,406,852 A | 4/1995 | Hiraka et al. |
| 5,703,296 A * | 12/1997 | Little et al. ............... 73/756 |
| 5,898,359 A * | 4/1999 | Ellis ........................ 338/47 |
| 6,619,133 B1 * | 9/2003 | Goshoo et al. ............. 73/754 |
| 6,842,970 B2 * | 1/2005 | Schafert et al. .......... 29/621.1 |
| 7,043,995 B2 | 5/2006 | Mattmann |
| 2003/0062982 A1 | 4/2003 | Jurgen |

FOREIGN PATENT DOCUMENTS

| | | |
|---|---|---|
| DE | 40 24 780 | 10/1991 |
| DE | 690 15 121 | 7/1995 |
| EP | 0 561 397 | 9/1993 |
| EP | 0 911 623 | 4/1999 |
| EP | 1 464 941 | 10/2004 |
| WO | WO 01/23855 | 4/2001 |
| WO | WO 2006/072391 | 7/2006 |

OTHER PUBLICATIONS

Search Report dated Nov. 1, 2007, issued for the corresponding European Patent Application No. 05 11 2467.

* cited by examiner

*Primary Examiner*—Edward Lefkowitz
*Assistant Examiner*—Freddie Kirkland, III
(74) *Attorney, Agent, or Firm*—Cohen Pontani Lieberman & Pavane LLP

(57) ABSTRACT

A force sensor includes a diaphragm-like carrier made of ceramic. Arranged on the carrier are thick-film resistors and a circuit of strain-sensitive thick-film conductor tracks, which are formed in particular as a Wheatstone bridge connecting the thick-film resistors to one another. A dielectric layer is arranged between the carrier and the thick-film resistors 5.

13 Claims, 2 Drawing Sheets

FORCE SENSOR

BACKGROUND OF THE INVENTION

The present invention relates to a force sensor, in particular a pressure sensor, having a diaphragm-like carrier made of ceramic, on which are arranged thick-film resistors and a circuit of strain-sensitive thick-film conductor tracks, which are formed as a Wheatstone bridge connecting the thick-film resistors to one another.

In known force sensors, the thick-film resistors and the thick-film conductor tracks are printed onto a carrier made of ceramic by screen printing and subsequently sintered thereon by a sintering process. Afterward, discrete components such as capacitors, ICs or transistors can be soldered onto the thick-film conductor tracks or be contact-connected by silver conductive adhesives.

For the measurement of pressures, resistive pressure sensors are increasingly being used inter alia in applications in the automotive sector. The strain-sensitive thick-film resistors, connected up to one another as a Wheatstone bridge, alter the offset signal present under mechanical bending of the diaphragm-like carrier. What is responsible for this is the so-called k-factor or gauge factor of said thick-film resistors which is a material-specific gain factor.

If low pressures are intended to be measured by the force sensor, only small output signals of a few millivolts are obtainable. These small signals are processed poorly by an electronic unit connected downstream compared to larger signals.

SUMMARY OF THE INVENTION

An object of the present invention to provide a force sensor of the type mentioned in the introduction which generates signals that can be processed well by an electronic unit connected downstream.

The object of the present invention is achieved by a force sensor having a dielectric layer arranged between the carrier and the thick-film resistors.

Furthermore, a dielectric layer may also be arranged between the carrier and the thick-film conductor tracks.

This design results in a considerable increase in the k-factor and thus also in a significantly improved processability of the signals of the signals generated by the force sensor by an electronic unit connected downstream.

It is possible to dispense with a very thin design of the diaphragm-like carrier, which simplifies and reduces the costs of producing the carrier.

For fixing the dielectric layer to the carrier, the dielectric layer may be sintered as a thick film onto the carrier.

In this case, the dielectric layer is preferably a glass layer.

The thick-film conductor tracks may also be sintered onto the dielectric layer.

The thick-film resistors may be sintered onto the dielectric layer.

If a mixed phase of the materials of thick-film resistors and dielectric layer is formed at the mutually adjoining regions of thick-film resistors and dielectric layer, then it is possible to achieve an increase in the k-factor by approximately 100%.

The dielectric layer and/or the thick-film resistors and/or the thick-film conductor tracks may, for example, each be sintered separately after the printing on thereof as thick-film pastes.

According to another embodiment, all of the dielectric layer, the thick-film resistors and the conductor tracks are first printed on as thick-film pastes and subsequently sintered jointly.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An exemplary embodiment of the invention is illustrated in the drawings and is described in more detail below.

DETAILED DESCRIPTION OF THE PRESENTLY PREFERRED EMBODIMENTS

Figure 1:
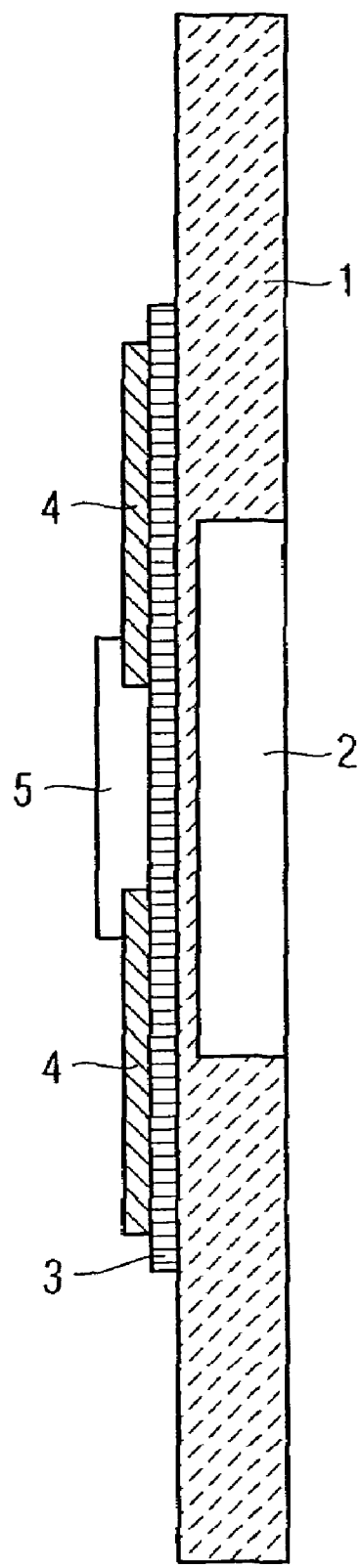
FIG. 1 is a cross-sectional view of a pressure sensor according to an embodiment of the present invention.

The pressure sensor illustrated has a plate-like carrier 1 made of ceramic, which has a central region with a pot-like recess 2, in which the carrier 1 has a significantly smaller thickness and is formed like a diaphragm.

The region of the carrier 1 outside the recess 2 is rigid, while the diaphragm-like region can be deflected through application of a pressure to be measured.

Using thick-film technology, a glass paste is printed onto the opposite side of the carrier 1 to the recess 2 using a screen printing method. The glass paste forms a dielectric layer 3 after a sintering operation.

Conductor track layers are printed onto the dielectric layer 3 from conductor paste, likewise by the screen printing method. The conductor track layers are subjected to a sintering operation and become thick-film conductor tracks 4 and 4'. A gap is formed between the conductor tracks 4 and 4'.

In the region of the gap, resistance paste is applied to the dielectric layer 3 using the screen printing method. For contact reliability, edge regions of the resistance paste overlap the conductor track layers at the free ends thereof and forms a thick-film resistor 5 after a sintering operation.

After the application of glass paste, conductor track layers and resistance paste, these are sintered in a sintering process.

Figure 2:
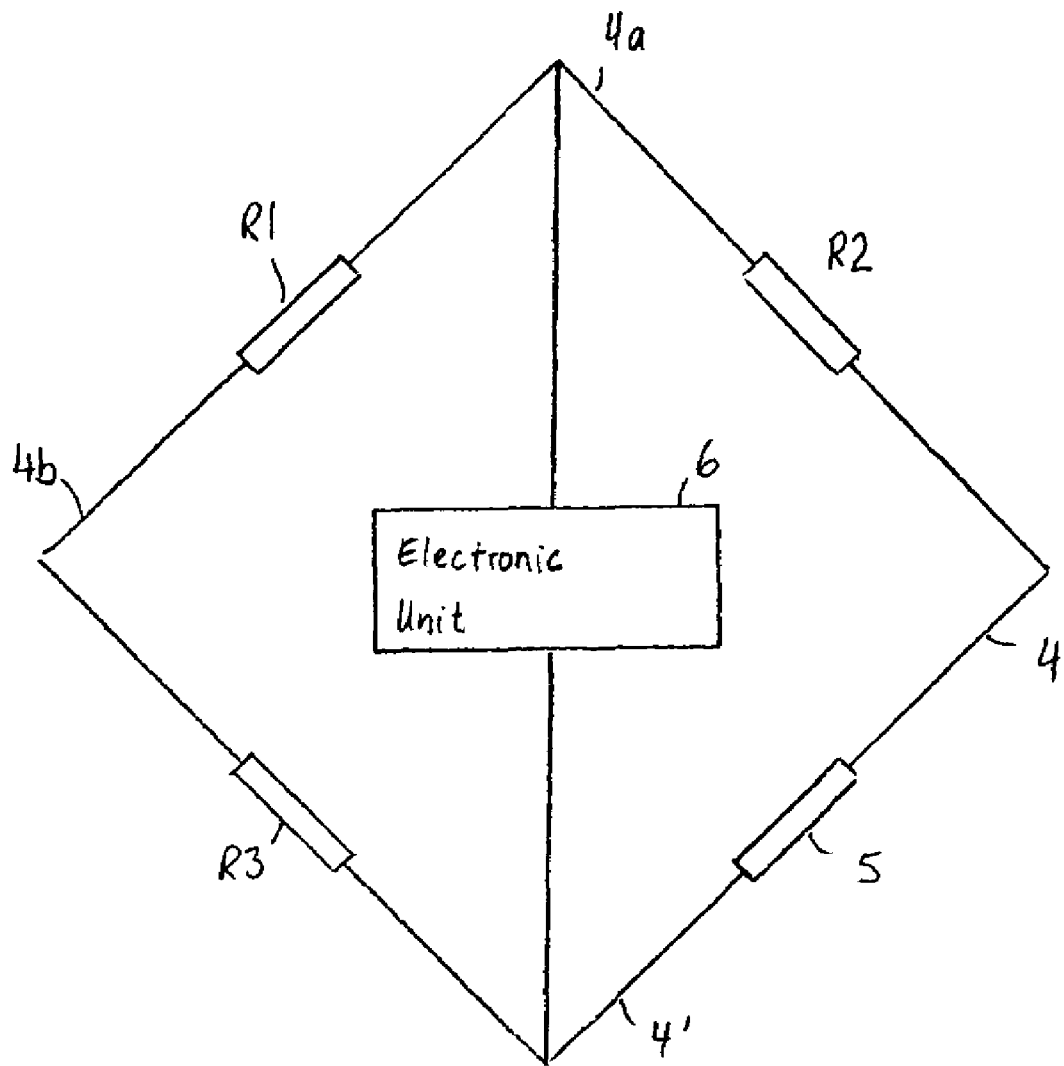
FIG. 2 is a schematic diagram of a circuit including the pressure sensor of FIG. 1.

FIG. 2 is a schematic circuit diagram showing the thick-film conductor tracks 4 and 4' together with further thick-film conductor tracks 4a, 4b of identical type and further thick-film resistors R1, R2, R3 of identical type form a Wheatstone bridge. Upon deflection of the diaphragm region of the carrier 1, the Wheatstone bridge generates an output signal proportional to the pressure that acts upon the diaphragm region and is to be measured. This output signal is forwarded to an electronic unit 6 for processing.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A force sensor for measuring a pressure, comprising:
   a carrier made of ceramic, the ceramic carrier having a recess so that a portion of the ceramic carrier bounded by the recess forms a diaphragm responsive to the pressure to be measured;
   thick-film resistors and a circuit of strain-sensitive thick-film conductor tracks arranged on said ceramic carrier, said thick-film conductor tracks connecting said thick-film resistors to one another; and
   a dielectric layer arranged between said ceramic carrier and said thick-film resistors;
   wherein the dielectric layer is configured to increase the K-factor of the thick-film resistors.

2. The force sensor of claim 1, wherein said dielectric layer is further arranged between said carrier and said thick-film conductor tracks.

3. The force sensor of claim 2, wherein said thick-film conductor tracks are sintered onto said dielectric layer.

4. The force sensor of claim 2, wherein each of said dielectric layer, said thick-film resistors, and said thick-film conductor tracks are sintered separately after the printing on thereof as thick-film pastes.

5. The force sensor of claim 2, wherein said dielectric layer and said thick-film resistors and said conductor tracks are printed on as thick-film pastes and subsequently sintered jointly.

6. The force sensor of claim 1, wherein said dielectric layer is sintered as a thick film onto said carrier.

7. The force sensor of claim 6, wherein said dielectric layer is a glass layer.

8. The force sensor of claim 1, wherein said thick-film resistors are sintered onto said dielectric layer.

9. The force sensor of claim 1, wherein a mixed phase of the materials of said thick-film resistors and said dielectric layer is formed at mutually adjoining regions of said thick-film resistors and said dielectric layer.

10. The force sensor of claim 1, wherein each of said dielectric layer, said thick-film resistors, and said thick-film conductor tracks are sintered separately after the printing on thereof as thick-film pastes.

11. The force sensor of claim 1, wherein said dielectric layer and said thick-film resistors and said conductor tracks are printed on as thick-film pastes and subsequently sintered jointly.

12. The force sensor of claim 1, wherein said carrier comprises a plate having an area with a the recess on a side of said carrier facing away from said dielectric layer, said portion of said carrier forming said diaphragm comprising said area with said recess.

13. The force sensor of claim 1, wherein said thick film conductor tracks connect said thick film resistors to form a Wheatstone bridge.

* * * * *